(12) United States Patent
Green, Jr.

(10) Patent No.: US 12,115,608 B2
(45) Date of Patent: Oct. 15, 2024

(54) BIASING MEMBER COMPRESSION FIXTURE

(71) Applicant: Adrian Steel Company, Adrian, MI (US)

(72) Inventor: James Levi Green, Jr., Onsted, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 18/307,042

(22) Filed: Apr. 26, 2023

(65) Prior Publication Data

US 2023/0356336 A1 Nov. 9, 2023

Related U.S. Application Data

(60) Provisional application No. 63/364,365, filed on May 9, 2022.

(51) Int. Cl.
*B23P 19/04* (2006.01)
*F16F 15/16* (2006.01)

(52) U.S. Cl.
CPC .......... *B23P 19/048* (2013.01); *F16F 15/164* (2013.01); *F16F 2236/04* (2013.01)

(58) Field of Classification Search
CPC ..................................................... B23P 19/048
See application file for complete search history.

(56) References Cited

U.S. PATENT DOCUMENTS

| 1,951,573 | A | | 7/1933 | Gehrig |
| 4,395,020 | A | | 7/1983 | Spainhour |
| 4,703,547 | A | * | 11/1987 | Togawa ................ B23P 19/048 29/227 |
| 4,732,365 | A | | 3/1988 | Kloster |
| 5,906,155 | A | | 5/1999 | Hammond |
| 6,631,541 | B2 | | 10/2003 | Mosing et al. |
| 7,386,926 | B2 | * | 6/2008 | Bosche ................. B25B 27/304 29/225 |
| 7,814,629 | B2 | | 10/2010 | Uzun |
| 8,191,862 | B2 | | 6/2012 | Arabian |
| 9,434,053 | B2 | | 9/2016 | Selkowitz |
| 10,005,175 | B2 | | 6/2018 | Morris |
| 2019/0118359 | A1 | | 4/2019 | Verbowski |

* cited by examiner

*Primary Examiner* — Sarang Afzali

(74) *Attorney, Agent, or Firm* — Marshall & Melhorn, LLC

(57) ABSTRACT

A biasing member compression fixture may have a first leg and a second leg. The legs may be substantially parallel one another and separated by a gap. The fixture may also have a base member connecting the first and second legs and extending across the gap. The biasing device may be connected to the base member and a ram may be connected to the biasing device. An upper member may connect the first and second legs and extend across the gap. A recess may be located in the upper member. A biasing member detecting unit may be connected to the upper member and may be adapted to detect a biasing member in the recess.

13 Claims, 4 Drawing Sheets

BIASING MEMBER COMPRESSION FIXTURE

BACKGROUND

Biasing members, such as shock absorbers, are well-known devices that typically have a movable piston located at least partially within a housing filled with fluid or capable of accepting fluid, or a housing containing a spring. The piston may be connected to a piston rod that at least partially extends out of the housing. For fluid filled biasing members, flow control devices, such as valves within the housing, control the flow of fluid within the housing and control the rate at which the piston can move within the housing.

In some applications, the biasing members may be set up so that the piston rod can only be moved (such as compressed) by a significant force, which may be beyond what a human can safely, reliably, quickly, comfortably and/or repeatedly compress.

It would be advantageous for a device to be able to safely, reliably, quickly and repeatedly compress biasing members to avoid the need for significant human effort to do so and/or so that the compressed biasing member can be efficiently installed in an application for further use.

SUMMARY

In one embodiment, a biasing member compression fixture may have a first leg and a second leg. The legs may be substantially parallel one another and separated by a gap. The fixture may also have a base member connecting the first and second legs and extend across the gap. A biasing device may be connected to the base member and a ram may be connected to the biasing device. The fixture may also comprise an upper member connecting the first and second legs and extending across the gap. A recess may be located in the upper member. The fixture may also have a biasing member detecting unit connected to the upper member and adapted to detect a biasing member in the recess.

In another aspect, the base member may connect lower portions of the first and second legs and the upper member may connect upper portions of the first and second legs.

In another aspect, a front surface of the base member may be coplanar with front surfaces of the legs and a back surface of the base member may be coplanar with rear surfaces of the legs.

In another aspect, an aperture may be located substantially centered between the front surface and the back surface of the base member, wherein the aperture extends parallel the first and second legs.

In another aspect, the upper member may have a front surface that is recessed with respect to front surfaces of the legs.

In another aspect, the recess may be U-shaped and open toward the base member.

In another aspect, a fixture axis may bisect the recess located in the upper member.

In another aspect, the recess may extend inwardly into the upper member from a front surface of the upper member.

In another aspect, the recess may have a step defining the recess in to a first portion with a first depth and a second portion with a second depth in the upper member.

In another aspect, the biasing member detecting unit may be a sensor located in the recess.

In another aspect, the biasing device and ram may be co-axial with the fixture axis.

In another aspect, the biasing device may be at least partially located in the aperture in the lower member.

In another aspect, the ram and the recess may be adapted to selectively receive a biasing member.

DETAILED DESCRIPTION

It is to be understood that the fixture may assume various alternative orientations and step sequences, except where expressly specified to the contrary. It is also to be understood that the fixture illustrated in the attached drawings, and described in the following specification is simply an exemplary embodiment. Hence, specific dimensions, directions or other physical characteristics relating to the embodiments disclosed are not to be considered as limiting, unless expressly stated otherwise.

Figure 1:
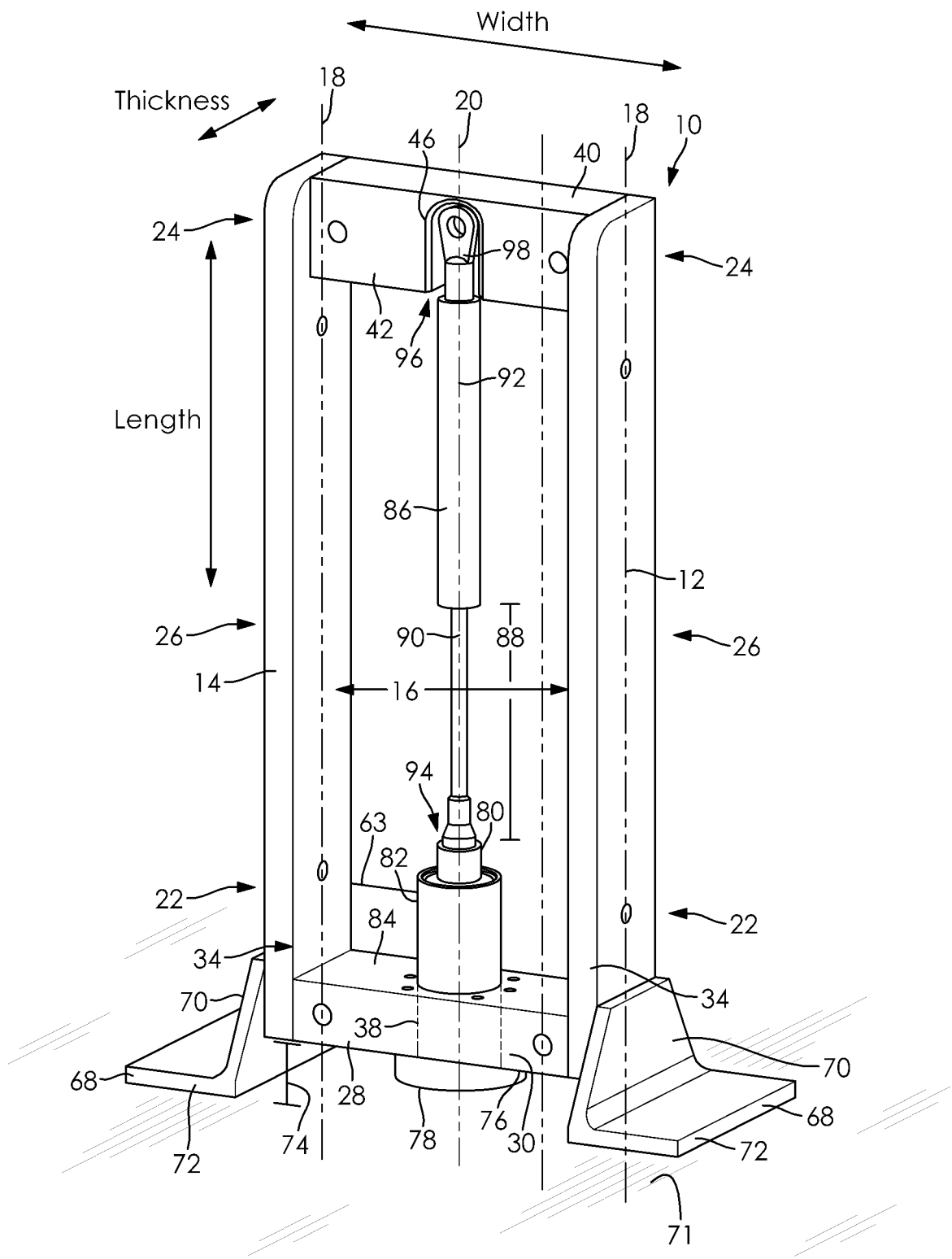
FIG. 1 is a front perspective view of one embodiment of a biasing member compression fixture in a first condition.
Figure 2:
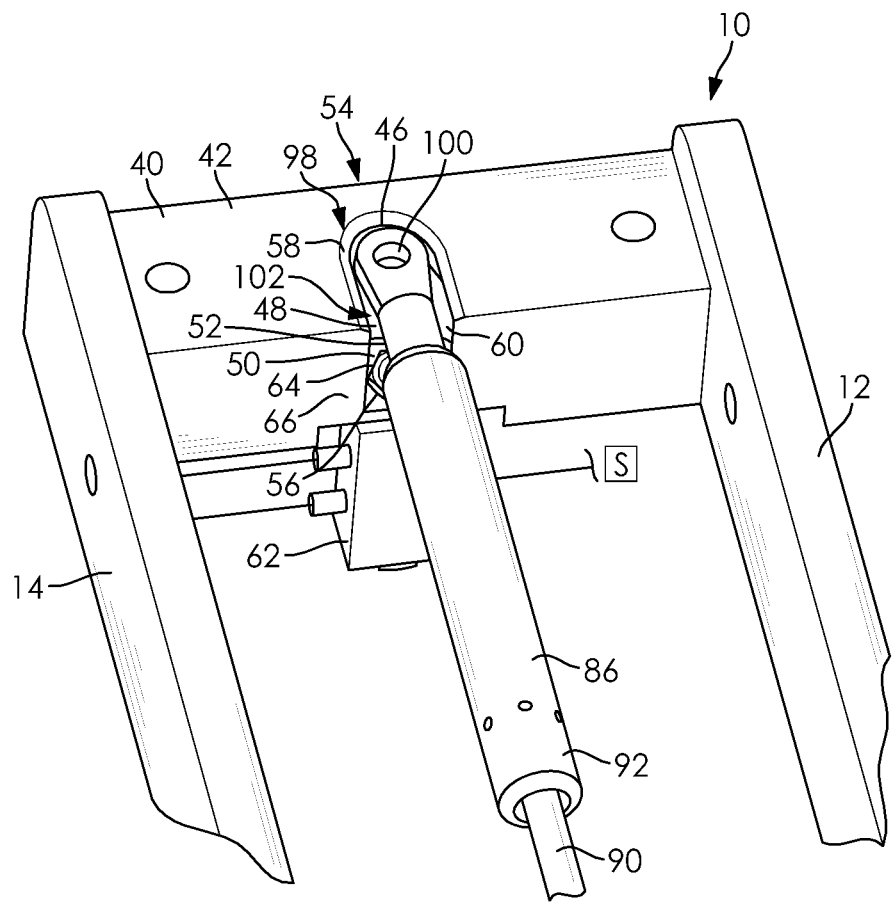
FIG. 2 is a front perspective view of a portion of the fixture from FIG. 1.
Figure 3:
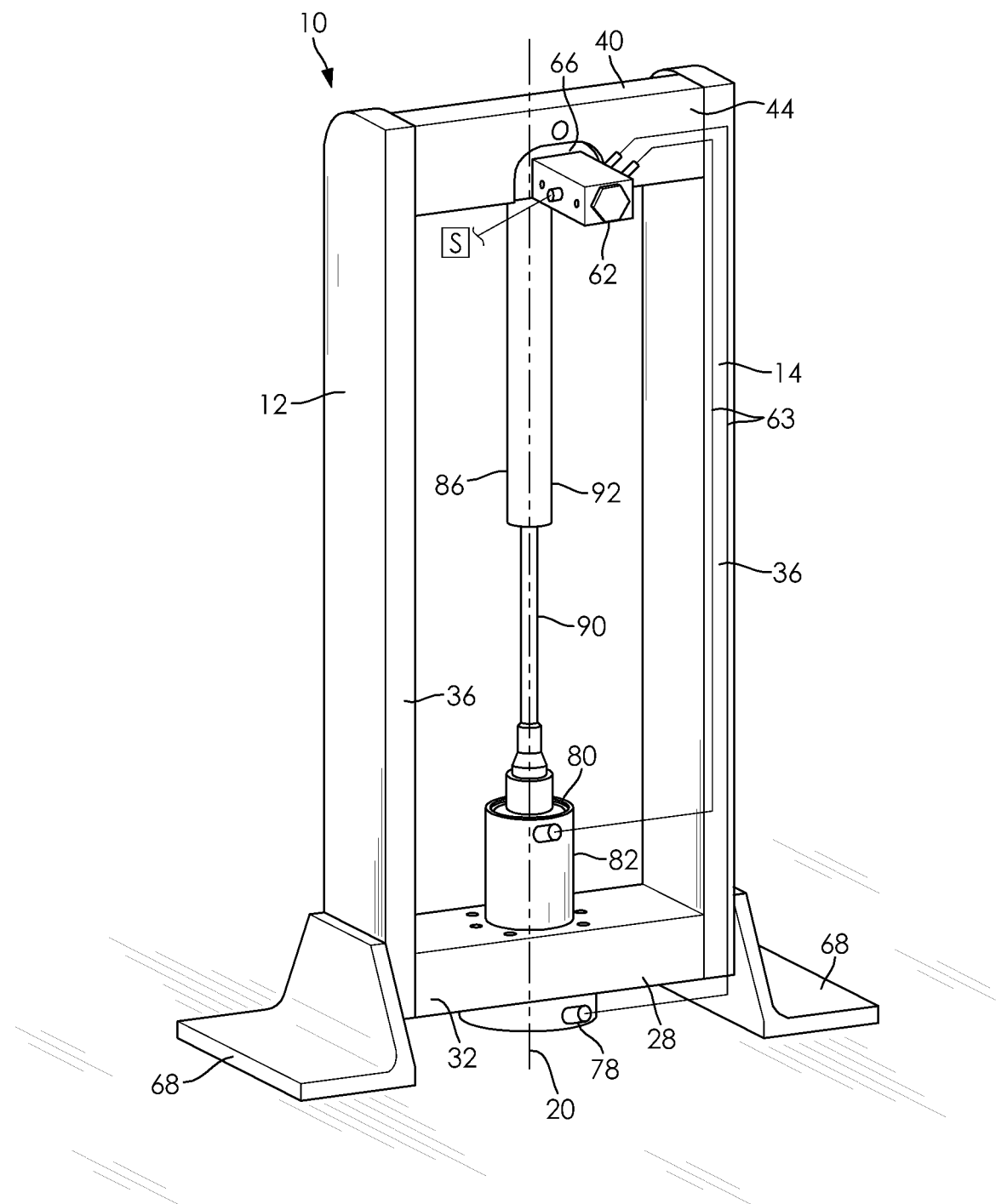
FIG. 3 is rear perspective view of the fixture in FIG. 1.

Turning now to FIGS. 1-3, one embodiment of a biasing member compression fixture 10 is depicted. The fixture 10 may have two legs 12, 14. The legs 12, 14 may extend substantially parallel one another, and they may be spaced apart from one another. The space or gap 16 between them may be substantially constant along the length of the legs 12, 14.

The legs 12, 14 may each have a primary axis 18 that extends along their primary length or direction. The primary direction may be substantially parallel a primary axis 20 of the fixture 10. The legs 12, 14 may also each define a width that is a small percentage of the length. The legs 12, 14 may also each have a depth that may be larger than the width but also a small percentage of the length. The legs 12, 14 may be substantially similar to one another in terms of size, shape and orientation, or they may have variations.

In one embodiment, the legs 12, 14 may each have a generally rectangular shape and have a generally rectangular cross-section. The legs 12, 14 may be constructed of a robust material substantially resistant to bending in the width or depth directions and substantially resistant to extension or compression on the length direction. In one embodiment, the legs 12, 14 may be constructed of metal, composite materials, fiberglass and/or polymers.

While two legs 12, 14 are mentioned, the fixture 10 may have a greater or fewer number. By way of example only it may be that each leg 12, 14 can be divided, thus providing a total of four or more legs. The legs 12, 14 may have different sizes, shapes and orientations. In some embodiments, the legs 12, 14 may be spaced equally or unequally from one another around the fixture axis 20.

The legs 12, 14 may have a lower portion 22 and an upper portion 24 where the upper and lower portions 22, 24 may be connected together by an intermediate portion 26. The legs 12, 14 may each be one piece, integrally formed and unitary or they may be comprised of multiple pieces.

The lower portions 22 of each leg 12, 14 may be connected together by a base member 28. The base member 28 may extend generally transversely from one lower portion 22 to the other lower portion 22. The lower portion 22 may be shaped such as a rectangular block, but other sizes and shapes may be used. The lower portion 22 may be one piece, integrally formed and unitary, or it may be comprised of multiple pieces.

The base member 28 may be fixed to each leg 12, 14, such as through welding, mechanical fasteners and/or male/female type connections. It is also possible for the base member 28 and the legs 12, 14 to be one piece, integrally formed and unitary with one another. In one embodiment, the base member 28 may be constructed of metal, composite materials, fiberglass and/or polymers.

The base member 28 may have a complementary depth to the depth of the legs 12, 14 such that a front and back surface 30, 32 of the base member 28 are substantially coplanar with a front and a back surface 34, 36 of the legs 12, 14, respectively.

In some embodiments, the base member 28 may have an aperture 38 extending therethrough. The aperture 38 may be oriented through the base member 28 such that it extends substantially parallel the legs 12, 14. The aperture 38 may be centered within the base member 28 such that it is equidistant from the two legs 12, 14. A center of the aperture 38 may be aligned with the fixture axis 20. The aperture 38 may extend continuously through the base member 28 with a substantially constant diameter.

The upper portion 24 of each leg 12, 14 may be connected by an upper member 40. The upper member 40 may extend generally transversely from one leg upper portion 24 to the other leg upper portion 24. The upper member 40 may be shaped such as a rectangular block, but other sizes and shapes may also be used. The upper member 40 may be one piece, integrally formed and unitary or it may be comprised of multiple pieces. In one embodiment, the upper member 40 may be constructed of metal, composite materials, fiberglass and/or polymers.

The upper member 40 may be fixed to each leg 12, 14, such as through welding, mechanical fasteners and/or male/female type connections. It is also possible for the upper member 40 and the legs 12, 14 to be one piece, integrally formed and unitary with one another.

The upper member 40 may have a complementary depth to the depth of the legs 12, 14 or the upper member 40 may have a smaller depth, such as shown in the figures. In the case where the upper member 40 has a smaller depth, a front surface 42 of the upper member 40 may be recessed with respect to front surfaces 42 of the legs 12, 14. A rear surface 44 of the upper member 40 may be flush with back surfaces 36 of the legs 12, 14 or also recessed with respect to the back surfaces 36.

In some embodiments the upper member 40 may have a recess 46 therein. The recess 46 may be curvilinear but other shapes may be permissible. The depicted embodiment of the recess 46 may be characterized as having a general U-shape with the U opening toward the base member 28. The recess 46 may be located on the upper member 40 so that it is generally bisected by the fixture axis 20. The recess 46 may extend from the front surface 42 of the upper member 40 into the depth of the upper member 40. In some cases, the recess 46 does not extend from the front surface 42 to the rear surface 44 of the upper member 40.

As shown in exemplary FIG. 2, the recess 46 may be such as a stepped recess with a first surface 48 at a first depth and a second surface 50 at a second depth, which may be greater than the first depth. The two surfaces 48, 50 may be parallel one another, but they may not have the same shape or size. The two surfaces 49, 50 may be connected by a step 52 extending into the depth of the upper member 40. In some embodiments, the first surface 48 may be closer to a vertex 54 of the recess 46 while the second surface 50 may be positioned closer to an opening 56 of the recess 46.

The recess 46 may have the shape noted above, but other shapes may be permissible, such as rectilinear or parabolic.

The front surface 42 of the upper member 40 may have a radius portion 58 that transitions to the substantially planar first surface 48 to the recess 46. The radius portion 58 may extend to a recess wall 60 that is angled in the length direction but generally transverse the width direction.

In one embodiment, best seen in FIGS. 2 and 3, the fixture 10 may have a biasing member detecting unit 62. The unit 62 may be located anywhere, including the upper member 40. In the depicted embodiment, the unit 62 may be located on, or in, the rear surface 44 of the upper member 40, such as at least partially aligned with the recess 46.

The unit 62 may be comprised of a sensor, detector or transducer (herein all designated as sensor 64), including but not limited to, optical, pressure, sonic, proximity, pressure, position, motion, force, and/or electromagnetic sensor(s). The sensor 64 may be directed at the recess 46 so that the sensor 64 and the unit 62 may be adapted to detect the presence, or absence, of a structure located in the recess 46.

In some embodiments, the unit 62 may be comprised of a plate 66. The plate 66, when installed in the recess 46, may at least partially comprise the rear surface 44 of the upper member 40. The unit 62 and/or the plate 66 may be selectively removable from the fixture 10.

The unit 62 may also be adapted to receive pressurized fluid, such as air, in a manifold like function and/or to control the flow of the fluid, such as to regulate the amount and/or pressure of the fluid.

The fluid may enter the unit from a source S, such as compressor or the like. The fluid may enter into a manifold (not shown) within the unit 62. The manifold may split the fluid in any desired fraction. The fluid may exit the manifold and the unit 62 through one or more lines 63 a casing and/or a ram (described below) or a biasing device (described below)

In some embodiments as shown in FIGS. 1 and 3, feet 68 may be attached to each leg 12, 14. The feet 68 may be L-shaped with a first portion 70 of the L attached to a leg 12, 14 and a second portion 72 of the L extending generally transverse the first portion 70. The second portion 72 may be adapted to rest on a work surface 71, or the like, or be secured thereto such as with mechanical fasteners. While two feet 68 are mentioned, additional feet, or other supporting structures, may be attached to the legs 12, 14 and/or the lower portion 22 to support the fixture 10 on a work surface 71. In addition, feet 68 that have other shapes may be used.

In some embodiments, the feet 68 may elevate the base member 28 above the work surface 71, or the surface on which the fixture 10 may be located. Thus, a gap 74 may exist between a lower surface 76 of the base member 28 and the work surface 71. The gap 74 may be constant across the length of the base member 28. Of course, if the base member 28 doesn't have a planar lower surface 76 the gap 74 may be variable.

Some embodiments may locate a biasing device 78 on or in the base member 28. By way of example only, the biasing device 78 may be located, at least in part, on or in the lower surface 76 of the base member 28. The biasing device 78 may also be located in, or perhaps below, the aperture 38 in the base member 28, such as centered therein.

In other embodiments, the biasing device 78 may be located on the upper member 40 or one of the legs 12, 14. In such a case, the recess 46 may be located on the base member 28.

The biasing device 78 may take different forms including, but not limited to, a hydraulic cylinder, a pneumatic cylinder, a solenoid and/or a metal spring such as a coil or leaf spring. In one embodiment, the biasing device 78 may be a fluid driven device connected to a source of pressurized fluid.

The biasing device 78 may be connected to a ram 80. The ram 80 may be at least partially housed within a casing 82 located at least partially in the aperture 38 or the casing 82 may be located on the upper surface 84 of the base member 28. In some embodiments, the casing 82 may have a generally circular cross-section. The ram 80 may be aligned with the fixture axis 20. The ram 80 may be adapted for selective movement, such as linear movement, along the axis 20 by virtue of the biasing device 78.

The biasing device 78 may be connected, such as electronically connected through one or more wires or through wireless communication, to the biasing member detecting unit 62.

A biasing member 86 may be located in the fixture 10. When the biasing member 86 is initially located within the fixture 10, the biasing member 86 may have a first length, as shown in FIG. 1. The biasing member 86 may be such as a shock absorber or similar structure, that may selectively collapse or telescope in or on itself generally in at least along a linear direction. The linear direction may be parallel and/or coplanar with the unit axis 20. The biasing member 86 may have a piston rod 90 that is selectively biased outward from a housing 92 such as through a spring member or pressurized (or pressurizable) fluid within the housing 92 that acts on a piston within the housing 92. The piston rod 90 may be connected to the piston within the housing 92.

In one embodiment, a first end portion 94 of the biasing member 86 may be located in contact with the ram 80. It may be preferred that the first end portion 94 rests directly on or in the ram 80. The first end portion 94 of the biasing member 86 may be associated with the movable piston or piston rod 90 of the biasing member 86. The first end portion 94 may simply be the end of the piston or piston rod 90, or it may have a shape or fixture thereon. The shape or fixture may be such as for receiving a fastener or the like therein to secure the biasing member 86 to another device in its final installation location.

A second end portion 96 of the biasing member 86 may be located within the recess, such as adjacent or in contact with the first surface 48. In certain embodiments, the second end portion 96 of the biasing member 86 may be curvilinear and at least a portion of it may have a complementary shape to the vertex 54 of the recess 54 to help retain the biasing member 86 in the fixture 10. In some embodiments, the second end portion 96 of the biasing member 86 may be fixed to the housing 92 and it may have a curvilinear bar or tube 98 with an aperture 100 extending therethrough. The aperture 100 may be designed to receive a stud or fastener for securing the biasing member 86 in its final installation location. The bar 98 may be offset from the second surface 50 by a gap 102. The biasing member 86 may be substantially coplanar and parallel with the fixture axis 20 when installed as described above.

Figure 4:
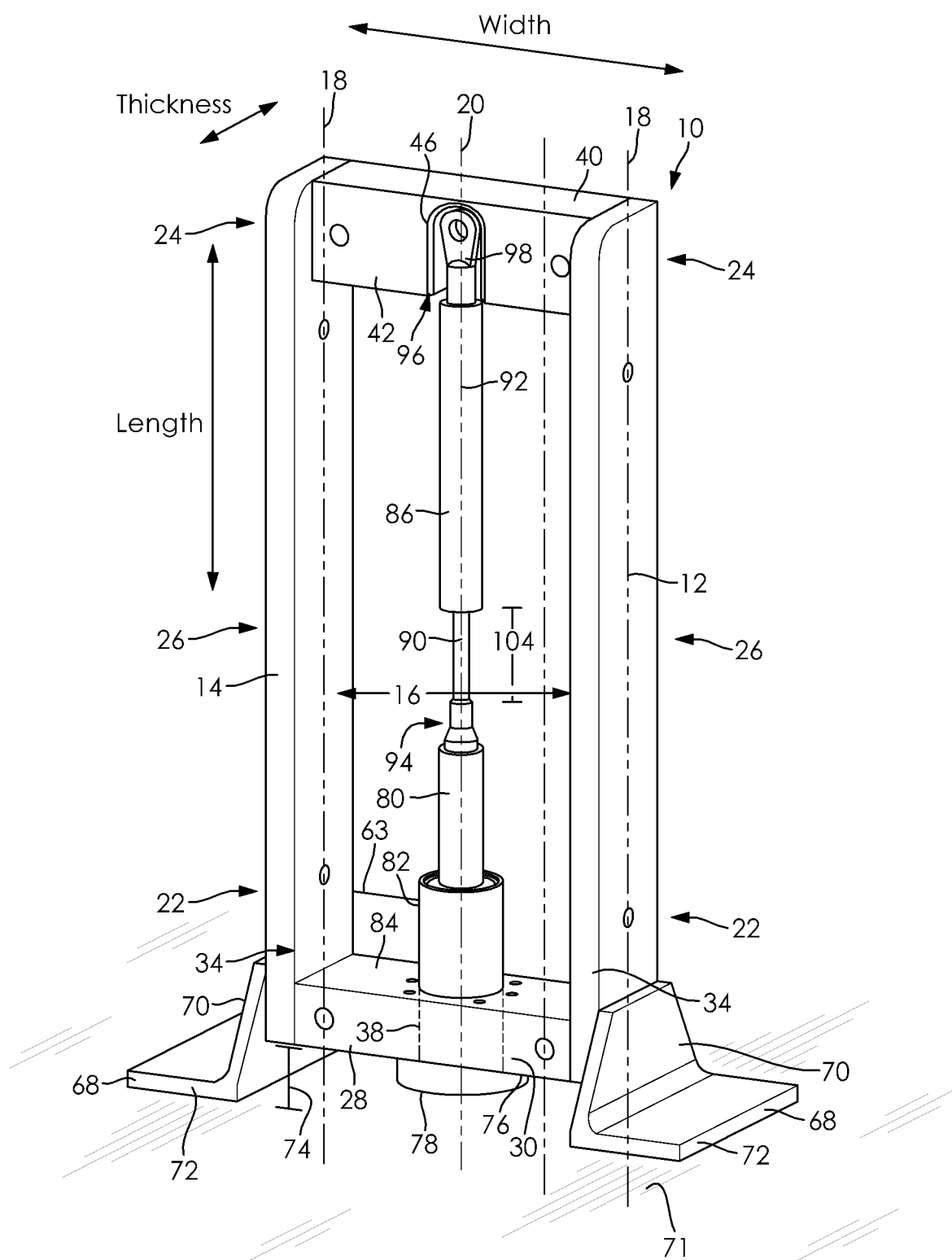
FIG. 4 is a front perspective view of one embodiment of a biasing member compression fixture in a second condition.

The biasing member detecting unit 62 may detect the presence of the first end portion 94 of the biasing member 86 in the fixture 10. The unit 62 may then signal the biasing device 78 associated with the base member 28 to engage. The base member biasing device 78 moves the ram 80 along the fixture axis 20 which in turn moves the piston and/or piston rod 90 into the piston housing 92, thus compressing the biasing member 86. The biasing member 86 may have a second length 104 that is less than the first length 88, as shown in FIG. 4.

The compressed biasing member 86 may then be moved from the fixture 10 and located in another device before the piston/piston rod 90 substantially expands from the housing 92 to make installation of the biasing member 86 safer, faster and easier for the installer. In some cases, the fixture 10 may compress the biasing member 86 to a predetermined length so that the first end portion 94 and the second end portion 96 are positioned at connection points for components to be connected by the biasing member 86. In some cases, the rate of expansion of the biasing member 86 is such that it can take approximately 5-20 seconds for the biasing member 86 to extend from its second length 104 to its first length 88. In most cases, this provides sufficient time for the first and second end portions 94, 96 to be connected to the respective connection points.

In some embodiments the same fixture 10 described above may be adapted to accommodate one or more biasing members 86 to compress the biasing members 86 as noted above. The fixture 10 may compress the biasing members 86 substantially simultaneously or at different times dependent upon the needs of the installer.

In accordance with the provisions of the patent statutes, the present device has been described in what is considered to represent its preferred embodiments. However, it should be noted that the device can be practiced otherwise than as specifically illustrated and described without departing from its spirit or scope.

What is claimed is:

1. A biasing member compression fixture, comprising:
a first leg and a second leg, wherein the legs are substantially parallel to one another and separated by a gap,
a base member connecting the first and second legs and extending across the gap,
wherein a biasing device is connected to the base member and a ram is connected to the biasing device,
an upper member connecting the first and second legs and extending across the gap,
wherein a recess is located in the upper member,
wherein a fixture axis bisects the recess located in the upper member,
wherein the biasing device and the ram are co-axial with the fixture axis, and
a biasing member detecting unit connected to the upper member and adapted to detect a biasing member in the recess.

2. The biasing member compression fixture of claim 1, wherein the base member connects lower portions of the first and second legs and the upper member connects upper portions of the first and second legs.

3. The biasing member compression fixture of claim 1, wherein a front surface of the base member is coplanar with front surfaces of the legs and a back surface of the base member is coplanar with rear surfaces of the legs.

4. The biasing member compression fixture of claim 3, wherein an aperture is located substantially centered between the front surface and the back surface of the base member, wherein the aperture extends parallel to the first and second legs.

5. The biasing member compression fixture of claim 4, wherein the biasing device is at least partially located in the aperture in the base member.

6. The biasing member compression fixture of claim 3, wherein the upper member has a front surface that is offset with respect to the front surfaces of the legs.

7. The biasing member compression fixture of claim 1, wherein the recess is U-shaped and opens towards the base member.

8. The biasing member compression fixture of claim 1, wherein the recess extends inwardly into the upper member from a front surface of the upper member.

9. The biasing member compression fixture of claim 1, wherein the recess may have a step defining the recess into a first portion with a first depth and a second portion with a second depth in the upper member.

10. The biasing member compression fixture of claim 1, wherein the biasing member detecting unit comprises a sensor located in the recess.

11. The biasing member compression fixture of claim 1, wherein the ram and the recess are adapted to selectively receive a biasing member.

12. The biasing member compression fixture of claim 1, wherein the biasing member detecting unit is directly connected to a rear surface of the upper member and is at least partially aligned with the recess.

13. The biasing member compression fixture of claim 1, wherein the biasing member detecting unit comprises a plate that is selectively removeable from the upper member.

* * * * *